United States Patent
Des li

(10) Patent No.: US 6,920,550 B2
(45) Date of Patent: Jul. 19, 2005

(54) SYSTEM AND METHOD FOR DECODING AND EXECUTING PROGRAM BINARIES

(75) Inventor: Giusepp Des li, Watertown, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 464 days.

(21) Appl. No.: 09/999,451

(22) Filed: Nov. 15, 2001

(65) Prior Publication Data

US 2003/0093650 A1 May 15, 2003

(51) Int. Cl.⁷ .................................................. G06F 9/30
(52) U.S. Cl. ........................ 712/227; 712/208; 713/190
(58) Field of Search ................................ 712/208, 227; 713/190; 717/136, 138, 139

(56) References Cited

U.S. PATENT DOCUMENTS

| | | | |
|---|---|---|---|
| 5,768,593 A | | 6/1998 | Walters et al. |
| 5,974,549 A | | 10/1999 | Golan |
| 6,275,938 B1 | | 8/2001 | Bond et al. |
| 6,820,255 B2 | * | 11/2004 | Babaian et al. ............. 717/151 |
| 2003/0101292 A1 | | 5/2003 | Fisher et al. |
| 2003/0101330 A1 | | 5/2003 | Duesterwald et al. |
| 2003/0101334 A1 | | 5/2003 | Desoli |
| 2003/0101381 A1 | | 5/2003 | Mateev et al. |
| 2003/0101431 A1 | | 5/2003 | Duesterwald et al. |
| 2003/0101439 A1 | | 5/2003 | Desoli et al. |
| 2003/0182653 A1 | | 9/2003 | Desoli et al. |
| 2003/0192035 A1 | | 10/2003 | Duesterwald et al. |
| 2004/0025165 A1 | | 2/2004 | Desoli et al. |

OTHER PUBLICATIONS

Bala et al., "Dynamo: A Transparent Dynamic Optimization System", Proceedings of the ACM SIGPLAN 2000 Conference on Programming Language Design and Implementation, vol. 35, iss. 5, May 2000, pp. 1–12.*

Desoli et al., "DELI: A New Run–Time Control Point", Proceedings of the 35th Annual IEEE/ACM International Symposium on Microarchitecture, Nov. 18–22, 2002, pp. 257–268.*

* cited by examiner

Primary Examiner—William M. Treat

(57) ABSTRACT

The present disclosure relates to a system and method for decoding program binaries. In one arrangement, the system and method pertain to intercepting program instructions, determining if associated instructions have been decoded and cached, and decoding and copying the program instructions if associated instructions have not been cached.

29 Claims, 6 Drawing Sheets

US 6,920,550 B2

SYSTEM AND METHOD FOR DECODING AND EXECUTING PROGRAM BINARIES

FIELD OF THE INVENTION

This disclosure generally relates to dynamic transformation of executing binary program code. More particularly, the disclosure relates to a system and method for decoding and executing program binaries.

BACKGROUND OF THE INVENTION

Recently, there has been increased interest in decreasing the amount of memory that is used in computing devices, such as personal digital assistants (PDAs) and embedded appliances, to reduce their cost. Unfortunately, the amount of memory that is needed typically increases with the functionality that is provided. Therefore, the greater functionality (e.g., number of applications) the user desires, the more memory that typically is needed.

In view of this situation, several solutions have been proposed to reduce the amount of memory that is needed for computing devices. In one such solution, a microprocessor having a high code density can be used. Although facilitating a reduction in the amount of memory needed, this solution may impact the level of performance achievable by the microprocessor and is therefore undesirable for many applications.

A more promising solution involves the use of code compression. In code compression, program code is compressed off line, i.e., during the code build time. Once compressed, the program code requires less memory and therefore facilitates the reduction of the amount of memory that must be provided in the computing device. The compressed code is stored in, for example, permanent memory (e.g., read only memory (ROM), a hard disk, a flash device) and, when the code is to be executed, it is decompressed.

Where the computing device has limited memory, it is preferable to only decompress blocks (e.g., pages) of code at a time. To do otherwise would defeat the purpose of compressing in the first place at least as far as memory preservation is concerned. Decompression can be accomplished with hardware or software that is configured for that purpose. Although hardware solutions work adequately well, they are somewhat inflexible in that the hardware must be modified or, more likely, replaced each time the underlying system is changed.

Software-based solutions are also viable, but problematic in that they typically require modification of the operating system (O/S) and normally slow performance in that large portions of code usually must be decompressed, even where only a small amount of code (number of instructions) is needed. In addition to slowing performance, decompression of large portions of code further requires a relatively large amount of memory to be available for the decompressed code. Unfortunately, it is difficult to decompress smaller portions of code in that hardware support is typically needed to accomplish this. Even if such hardware were available, however, the overhead penalty and efficiency decrease that accompanies such a form of decompression would render such a solution unattractive.

From the foregoing, it can be appreciated that it would be desirable to have a system and method for decoding program code so as to, for example, provide code decompression that avoids one or more of the problems identified above.

SUMMARY

The present disclosure relates to a system and method for decoding and executing program binaries. In one arrangement, the system and method pertain to intercepting program instructions, determining if associated instructions have been decoded and cached, and decoding and copying the program instructions if associated instructions have not been cached.

The present disclosure also relates to a decoding program stored on a computer-readable medium. In one arrangement, the decoding program comprises logic configured to intercept program instructions, logic configured to determine if associated instructions have been decoded and cached, and logic configured to decode and copy the program instructions that have not been cached.

In addition, the present disclosure relates to a dynamic execution layer interface (DELI) residing between at least one application and computing system hardware. In one arrangement, the DELI comprises a core configured to cache and execute certain application code fragments, an application programming interface configured to provide access to caching and executing functions of the core, and a system control and configuration layer configured to provide policies for operation of the core.

BRIEF DESCRIPTION OF THE DRAWINGS

The invention can be better understood with reference to the following drawings.

DETAILED DESCRIPTION

Disclosed is a system and method for decoding and executing program binaries. As is explained below, the nature of the decoding services provided can vary depending upon the particular application. By way of example, this decoding can comprise decompressing and/or decrypting program code. To facilitate description of the inventive system and method, example systems are discussed with reference to the figures. Although these systems are described in detail, it will be appreciated that they are provided for purposes of illustration only and that various modifications are feasible without departing from the inventive concept. Other example systems are described in U.S. patent application Ser. No. 09/924,260, filed Aug. 8, 2001, entitled "Dynamic Execution Layer Interface for Explicitly of Transparently Executing Application or System Binaries" (attorney docket no. 10011525-1), which is hereby incorporated by reference into the present disclosure. After the description of the example systems, examples of operation of the systems are provided to explain the manners in which decoding and executing of program binaries can be facilitated.

Figure 1:
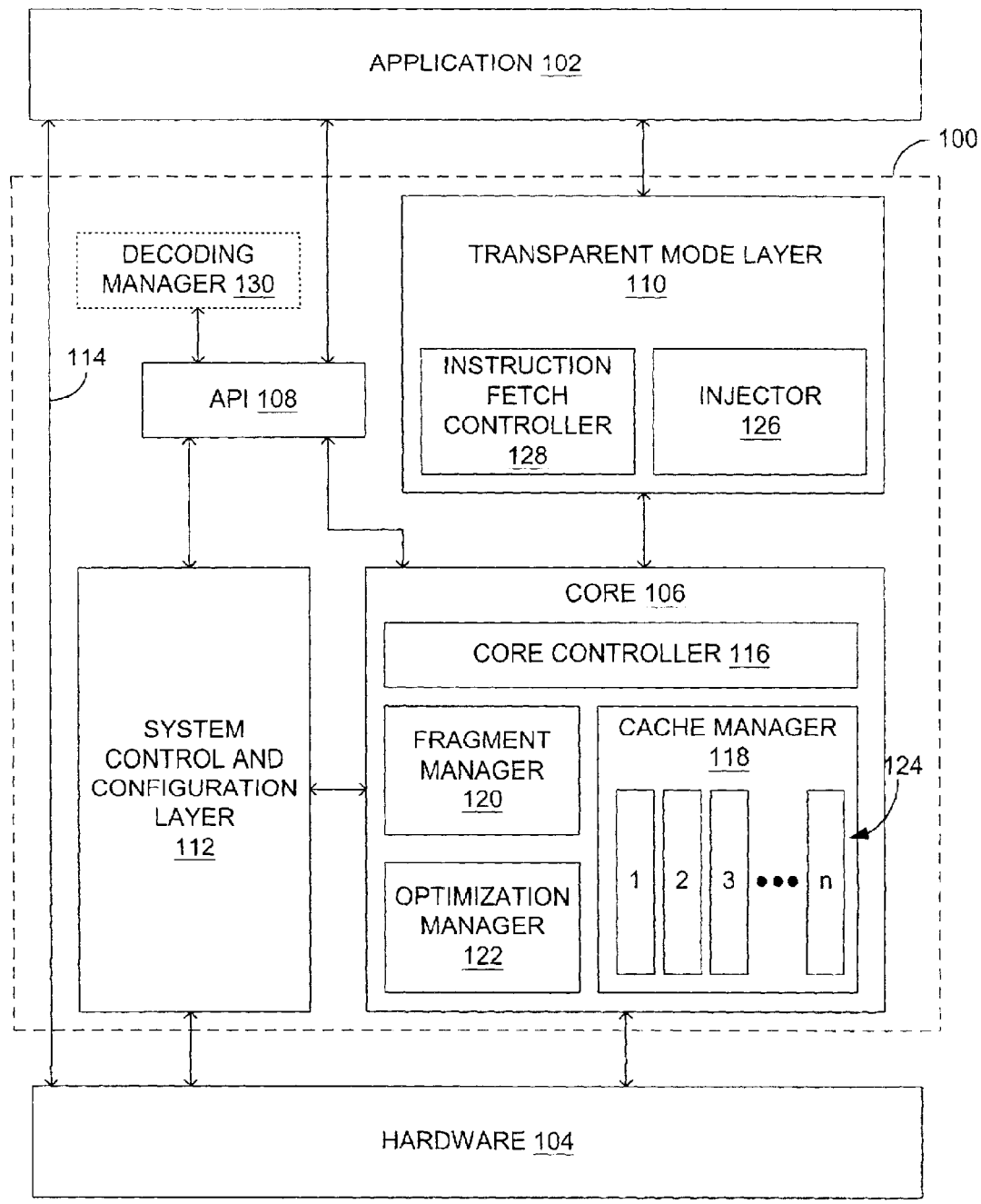
FIG. 1 is a block diagram illustrating an example of a dynamic execution layer interface (DELI) executing on a computer system to provide dynamic transformation services to applications and operating systems.

Referring now to FIG. 1, illustrated is an example dynamic execution layer interface (DELI) 100. Generally speaking, the DELI 100 comprises a generic software layer written in a high or low level language that resides between applications, including or not including an operating system (O/S), and hardware to untie application binary code from the hardware. Through this arrangement, the DELI 100 can provide dynamic computer program code transformation, caching, and linking services which can be used in a wide variety of different applications such as emulation, dynamic translation and optimization, transparent remote code execution, remapping of computer system functionality for virtualized hardware environments program, code decompression, code decrypting, etc. As is discussed in greater detail below, the DELI 100 can provide its services while operating in a transparent mode, a nontransparent mode, or combinations of the two. In the transparent mode, the DELI 100 automatically takes control of an executing program in a manner in which the executing program is unaware that it is not executing directly on computer hardware. In the nontransparent mode, the DELI 100 exports its services through an application programming interface (API) to the application to allow the application to control how the DELI 100 reacts to certain system events.

As depicted in FIG. 1, the DELI 100 resides between at least one application 102 and computer hardware 104. Depending upon the particular arrangement, the application 102 can comprise one or more user applications that are unaware of the DELI's presence and/or a client (e.g., emulator) that is aware of the DELI 100 and which is configured to utilize the DELI's services. More generally, however, the application 102 comprises any type of program code containing instructions to be executed by a computer processor. Where an O/S is used, the DELI 100 may reside either above or below the O/S (not indicated) depending upon the nature of the services that are provided. For example, when the DELI 100 operates above the O/S, it can only control execution of applications. If the DELI 100 operates below the O/S, however, the DELI has access to an instruction stream which can include a mix of system and user code both from the O/S and applications. The hardware 104 can comprise various different computer system components but typically at least comprises a computer processor.

The DELI 100 can include four main components including a core 106, an application programming interface (API) 108, a transparent mode layer 110, and a system control and configuration layer 112. Generally speaking, the core 106 exports two main services to both the API 108 and the transparent mode layer 110. The first of these services pertains to the caching and linking of native code fragments or code fragments which correspond to the instruction set of the hardware 104. The second pertains to executing previously cached code fragments. The API 108 exports functions from the application 102 that provide access to the caching and linking services of the core 106 in the nontransparent mode of operation. The transparent mode layer 110 enables the core 106 to gain control transparently over code execution in the transparent mode of operation as well as fetch code fragments to be cached. Finally, the system control and configuration layer 112 enables configuration of the DELI 100 by providing policies for operation of the core 106 including, for example, policies for the caching, linking, and optimizing of code. These policies can, for example, be provided to the layer 112 from the application 102 via the API 108. The system control and configuration layer 112 also controls whether the transparent mode of the DELI 100 is enabled, thus determining whether the core 106 receives input from the API 108, the transparent mode layer 110, or both.

As is further indicated in FIG. 1, the system 100 can include a bypass path 114 that can be used by the application 102 to bypass the DELI 100 so that the application can execute directly on the hardware 104, where desired. It is noted that such operation can be possible in that the DELI 100 is an optional execution layer which may or may not be utilized.

As is shown in FIG. 1, the core 106 comprises a core controller 116, a cache manager 118, a fragment manager 120, and an optimization manager 122. The core controller 116 functions as a dispatcher that assigns tasks to the other components of the core 106 that are responsible for completing the tasks. The cache manager 118 comprises a mechanism (e.g., set of algorithms) that controls the caching of the code fragments within one or more code caches 124 (e.g., caches 1 through n) according to the policies specified by the system control and configuration layer 112 as well as the fragment manager 120 and the optimization manager 122. The one or more code caches 124 of the core 106 can, for instance, be located in hardware caches on one or more processors of the hardware 104, or can be created in the main local memory of the hardware. Where the code cache(s) 124 is/are mapped in hardware caches onboard the processor(s), greatly increased performance can be obtained due to reduced instruction cache refill overhead, increased memory bandwidth, etc. The fragment manager 120 specifies the arrangement of the code fragments within the code cache(s) 124 and the type of transformation that is imposed upon the fragments. Finally the optimization manager 122 contains the set of optimizations that can be applied to the code fragments to optimize their execution.

As noted above, the API 108 exports functions from the application 102 that provide access to DELI services. More specifically, the API 108 exports caching and linking services of the core 106 to the application 102, which typically comprises a client that is aware of the DELI's presence. These services exported by the API 108 enable the application 102 to control the operation of the DELI 100 in the nontransparent mode by (i) explicitly emitting code fragments to the core 106 for caching and/or by (ii) instructing the DELI 100 to execute specific code fragments out of its code cache(s) 124. In addition, the API 108 also can export functions that initialize and discontinue operation of the DELI 100. For instance, the API 108 can initiate transparent operation of the DELI 100 and further indicate when the DELI is to cease such operation. The API 108 also, as mentioned above, facilitates configuration of the DELI 100 by delivering policies specified by the application 102 to the core 106 (e.g., to the fragment manager 120 and/or the optimization manager 122). Use of the API 108 in facilitating operation in a nontransparent mode is described below in relation to FIG. 5.

With further reference to FIG. 1, the transparent mode layer 110 typically includes an injector 126 which is used to gain control over a running application 102 transparently. When the DELI 100 operates in a completely transparent mode (i.e., where the application is unaware of the DELI's presence) the injector 126 is used to inject the DELI into the application 102 before the application begins execution so that the application can be run under DELI control. In such circumstances, the DELI 100 avoids modifying the application's 102 executable image to avoid impeding exception handling. Control can be gained by the injector 126 in several different ways, each of which loads the application binaries without changing the virtual address at which the binaries are loaded. By way of example, the O/S kernel loader can be modified such that the DELI 100 (e.g., compiled as a shared library) is automatically loaded by the kernel loader when it loads the application's executable image. Alternatively, a user level loader can be used to leverage the kernel loader without modifying it to load the application 102 in memory in suspended mode and later inject instructions into the application (e.g., on the application stack) that will load the DELI 100 shared library later when the application is resumed.

In another alternative, ptrace can be used to attach the DELI 100 to the application 102. As is known in the art, ptrace is a mechanism often used by debuggers that allows one process to control another. The DELI 100 can be configured as a separate process that attaches to the application 102 via ptrace, and runs the application until the point where the execution start-up code at the top of the application's binary image (e.g., crt0) is about to call the application's entry point. Execution of the application 102 can then be suspended, and the DELI 100 can be used to fetch the application instructions and execute them on its behalf.

In yet another alternative, the application's text segment can be expanded in a separate copy of the executable file. In particular, the application's binary image can be copied to a temporary location, the application's text segment extended by adding a DELI text segment at the end, and the start symbol (i.e., the entry point that is called by crt0) changed to the DELI entry point. The resulting executable file can then be executed using exec. The original application's text segment is still loaded at the same virtual address that it would normally have, but the DELI 100 will gain control before the actual application 102 starts.

In another example, the DELI 100 can gain control over the application 102 using a special version of crt0. As is known in the art, the crt0 code is responsible for picking-up the command line arguments, setting up the initial stack and data segment, and then making a call to the value of the start symbol (usually the main() function of the application 102). Prior to calling the application 102 entry point, crt0 maps the dynamic link loader did, which then loads any dynamically linked libraries (DLLs) referenced by the application 102. A custom version of crt0 can be used to additionally map the DELI code (itself compiled as a DLL), and call the DELI's entry point instead of the one defined by the start symbol.

Irrespective of the manner in which control is obtained over the application 102, an instruction fetch controller 128 can then be used to extract (i.e., fetch) copies of fragments (e.g., traces) of the application binary code, pass them to the DELI core 106 for caching, and direct the core 106 to execute the appropriate cached copies out of its code cache (s) 124. Use of the transparent mode layer 110 in facilitating such operation is described below in relation to FIG. 4.

It is to be noted that, although the DELI 100 has been shown and described herein as including the transparent mode layer 110, persons having ordinary skill in the art will appreciate from this disclosure taken as a whole that this layer may be omitted altogether where operation of the DELI is solely controlled by the application 102 (i.e., client) via the API 108.

As noted above, the system control and configuration layer 112 enables configuration of the DELI 100 by providing policies for the caching and linking of code. Although the DELI 100 is not limited to any particular type of policy or policy content, the policies typically determine how the DELI will behave. For instance, the layer 112 may provide policies as to how fragments of code are extracted from the application 102, how fragments are created from the original code, how multiple code fragments can be linked together to form larger code fragments, etc. The layer's policies can be static or dynamic. In the former case, the policies can be hardcoded into the DELI 100, fixing the configuration at build time. In the latter case, the policies can be dynamically provided by the application 102 through function calls in the API 108. Implementation of the policies controls the manner in which the DELI 100 reacts to specific system and/or hardware events (e.g., exceptions and interrupts). In addition to the policies noted above, the system control and configuration layer 112 can specify the size of the code cache(s) 124, whether a log file is created, whether code fragments should be optimized, etc.

The system control and configuration layer 112 further supports the abstraction of system and hardware functionality by intercepting instructions in the application binary code directed at system and hardware functionality. These instructions are then replaced by the fragment manager 120 under the direction of the system control and configuration layer 112 as part of the fragment formation process. The system control and configuration layer 112 identifies instructions directed at missing or defective hardware and causes the fragment manager 120 to replace them with corresponding instructions directed at similar, but different, hardware 104 or with software simulations of the original hardware.

In addition to the above-identified components, the DELI 100 can, optionally, further include a decoding manager 130 that, for instance, comprises one or more algorithms responsible for decoding program binaries in some manner. For example, the decoding manager 130 can provide decompression and/or decryption services to the application 102. Use of the decoding manager 130, where provided, is described below with reference to FIG. 6.

Figure 2:
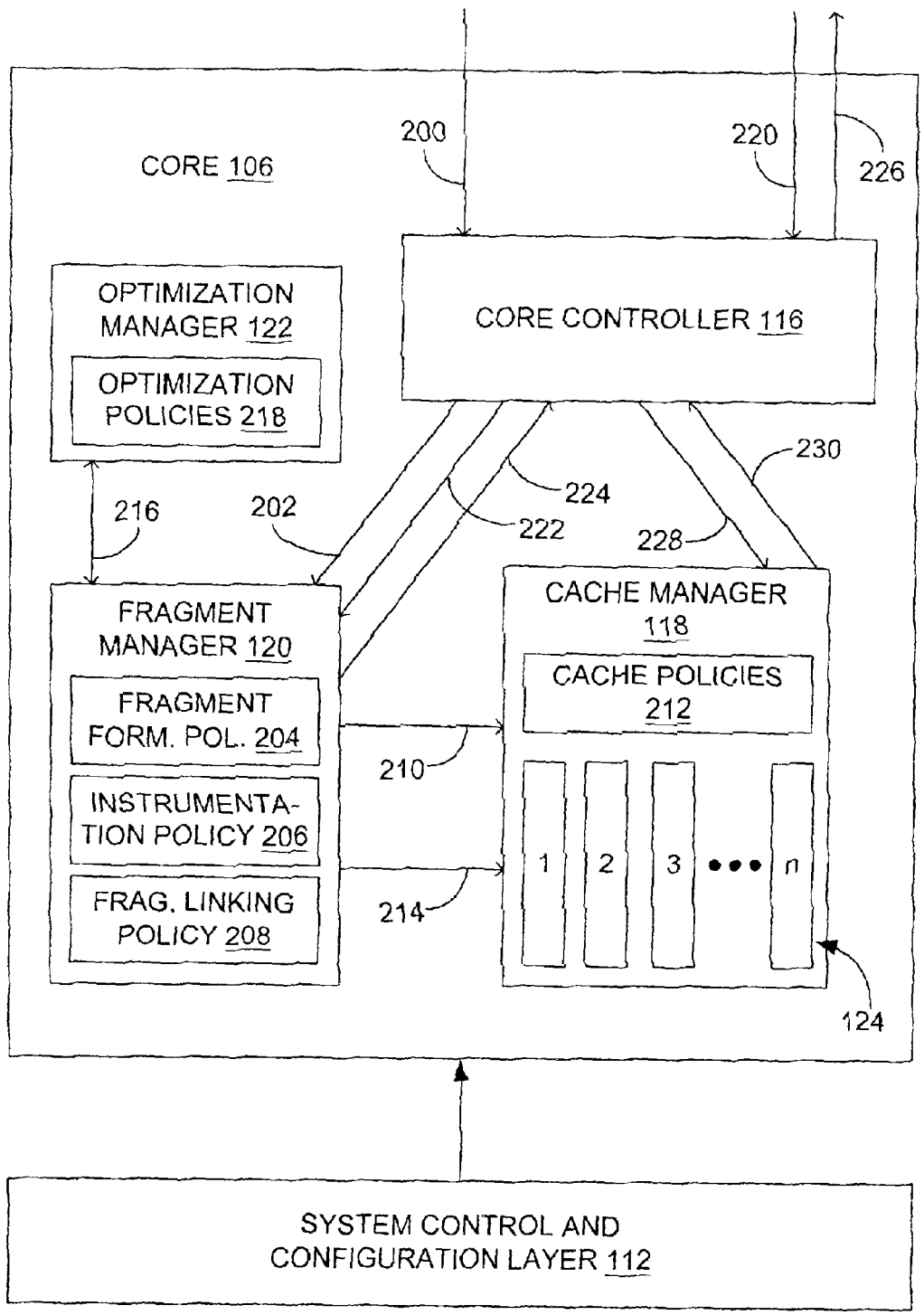
FIG. 2 is a block diagram of an example configuration and operation of a core of the DELI shown in FIG. 1.

FIG. 2 illustrates an example configuration of the core 106 and its operation. As indicated in this figure, the core 106 accepts two types of requests from the API 108 or the transparent mode layer 110. First, requests 200 can be accepted for caching and linking a code fragment through a function interface. Such a request can comprise a function in the form of, for instance, "DELI_emit_fragment(tag, fragbuf)". This function receives a code fragment as its parameters and an identifier (e.g., tag) to store in the DELI cache(s) 124. In addition, the core 106 accepts requests for initiating execution at a specific code fragment tag through a function interface such as "DELI_execute_fragment(tag) ", which identifies a code fragment stored in the cache(s) 124 to pass to the hardware 104 for execution.

The core controller 116 processes these requests and dispatches them to the appropriate core module. A request 202 to emit a code fragment with a given identifier can then be passed to the fragment manager 120. The fragment manager 120 transforms the code fragment according to its fragment formation policy 204, possibly instruments the code fragment according to its instrumentation policy 206, and links the code fragment together with previously cached fragments according to its fragment linking policy 208. For example, the fragment manager 120 may link multiple code fragments in the cache(s) 124, so that execution jumps to another code fragment at the end of executing a code fragment, thereby increasing the length of execution from the cache(s). To accomplish this, the fragment manager 120 issues fragment allocation instructions 210 to the cache manager 118. The fragment manager 120 then sends a request to the cache manager 118 to allocate the processed code fragment in the code cache(s) 124.

The cache manager 118 controls the allocation of the code fragments and typically is equipped with its own cache policies 212 for managing the cache space. However, the fragment manager 120 may also issue specific fragment deallocation instructions 214 to the cache manager 118. For example, the fragment manager 120 may decide to integrate the current fragment with a previously allocated fragment, in which case the previous fragment may need to be deallocated. In some arrangements, the cache manager 118 and fragment manager 120 can manage the code cache(s) 124 and code fragments in the manner shown and described in U.S. Pat. No. 6,237,065, issued May 108, 2001, entitled "A Preemptive Replacement Strategy for a Caching Dynamic Translator Based on Changes in the Translation Rate," which is hereby incorporated by reference into the present disclosure. Alternatively, management of the code cache(s) 124 and code fragments may be performed in the manner shown and described in U.S. patent application Ser. No. 09/755,389, filed Jan. 5, 2001, entitled "A Partitioned Code Cache Organization to Exploit Program Locality," which is also hereby incorporated by reference into the present disclosure.

Prior to passing a fragment to the cache manager 118, the fragment manager 120 may pass (216) the fragment to the optimization manager 122 to improve the quality of the code fragment according to its optimization policies 218. In some arrangements, the optimization manager 122 may optimize code fragments in the manner shown and described in U.S. patent application Ser. No. 09/755,381, filed Jan. 5, 2001, entitled "A Fast Runtime Scheme for Removing Dead Code Across Linked Fragments," which is hereby incorporated by reference into the present disclosure. Alternatively, the optimization manager 122 may optimize code fragments in the manner shown and described in U.S. patent application Ser. No. 09/755,774, filed Jan. 5, 2001, entitled "A Memory Disambiguation Scheme for Partially Redundant Load Removal," which is also hereby incorporated by reference into the present disclosure. Notably, the optimization manager 122 may also optimize code fragments using classical compiler optimization techniques, such as elimination of redundant computations, elimination of redundant memory accesses, inlining functions to remove procedure call/return overhead, etc.

As mentioned above, the fragment manager 120 transforms the code fragment according to its fragment formation policy 204. The transformations performed by the fragment manager 120 can include code relocation by, for instance, changing memory address references by modifying relative addresses, branch addresses, etc. The layout of code fragments may also be modified, changing the physical layout of the code without changing its functionality (i.e., semantic). These transformations are performed by the fragment manager 120 on fragments received through the API 108 and from the instruction fetch controller 128.

To perform code instrumentation, the fragment manager 120 gathers data according to the instrumentation policy 206 for code profiling, such as data on the frequency of execution of code fragments, the frequency with which a memory address is accessed, etc. Program counters can be used to collect these statistics in order to facilitate fragment formation or deallocation. These policies are configured by the system control and configuration layer 112, which receives policy instructions sent either through the API 108 or established at DELI build time. The policies may comprise options for different ways to create, instrument, optimize, and link fragments, or the policies may simply be hardcoded algorithms in the DELI 100 for performing these tasks.

The second type of request accepted by the DELI core 106 is a request 220 to execute a fragment identified by a given identifier (e.g., tag). In such a case, the core controller 116 issues a lookup request 222 to the fragment manager 120, which returns a corresponding code cache address 224 if the fragment is currently resident and active in the cache(s) 124. By way of example, the fragment manager 120 can maintain a lookup table of resident and active code fragments in which a tag can be used to identify the location of a code fragment. Alternatively, the fragment manager 120 or cache manager 118 can use any other suitable technique for tracking whether code fragments are resident and active. If the fragment is not currently resident and active in the cache(s) 124, the fragment manager 120 returns an error code to the core controller 116, which returns (226) the fragment tag back to the initial requester as a cache miss address. If, on the other hand, the fragment is currently resident and active, the core controller 116 then patches (228) the initial request to the cache manager 118 along with its cache address. The cache manager 118, in turn, transfers control to the addressed code fragment in its code cache(s) 124, thus executing the addressed code fragment. Execution then remains focused in the code cache(s) 124 until a cache miss occurs, i.e., until a copy for the next application address to be executed is not currently resident in the cache(s). This condition can be detected, for instance, by an attempt of the code being executed to escape from the code chache(s) 124. A cache miss is reported (230) from the cache manager 118 to the core controller 116 and, in turn, back (226) to the initial requester.

Figure 3:
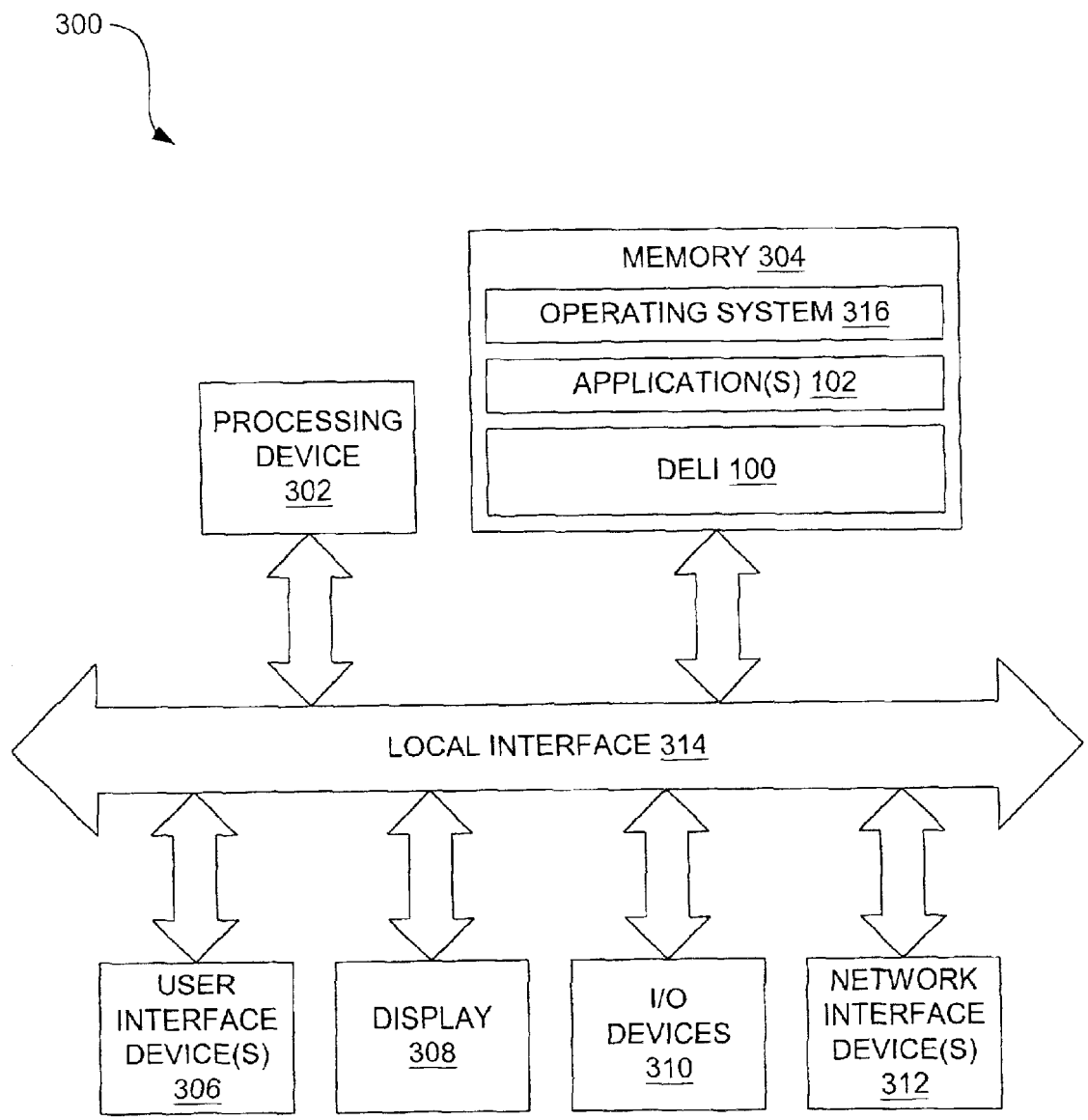
FIG. 3 is a block diagram of an example computer system on which the DELI shown in FIG. 1 can be executed.

FIG. 3 is a schematic view illustrating an example architecture for a computer system 300 on which the DELI 100 can execute. Generally speaking, the computer system 300 can comprise any one of a wide variety of wired and/or wireless computing devices, such as a desktop computer, portable computer, dedicated server computer, multi-processor computing device, cellular telephone, personal digital assistant (PDA), handheld or pen-based computer, and so forth. Irrespective its specific arrangement, the computer system 300 can, for instance, comprise a processing device 302, memory 304, one or more user interface devices 306, a display 308, one or more input/output (I/O) devices 310, and one or more networking devices 312, each of which is connected to a local interface 314.

The processing device 302 can include any custom made or commercially available processor, a central processing unit (CPU) or an auxiliary processor among several processors associated with the computer system 300, a semiconductor based microprocessor (in the form of a microchip), a macroprocessor, one or more application-specific integrated circuits (ASICs), a plurality of suitably configured digital logic gates, and other well known electrical configurations comprising discrete elements both individually and in various combinations to coordinate the overall operation of the computing system.

The memory 304 can include any one of a combination of volatile memory elements (e.g., random access memory (RAM, such as DRAM, SRAM, etc.)) and nonvolatile memory elements (e.g., ROM, hard drive, tape, CDROM, etc.). The memory 304 typically comprises an O/S 316, one or more applications 102 (e.g., user application and/or client), and the DELI 100, which has already been described in detail. Persons having ordinary skill in the art will appreciate that the memory 304 can, and typically will, comprise other components which have been omitted for purposes of brevity.

The one or more user interface devices 306 comprise those components with which the user can interact with the computing system 300. For example, where the computing system 300 comprises a personal computer (PC), these components can comprise a keyboard and mouse. Where the computing system 300 comprises a handheld device (e.g., PDA, mobile telephone), these components can comprise function keys or buttons, a touch-sensitive screen, a stylus, etc. The display 308 can comprise a computer monitor or plasma screen for a PC or a liquid crystal display (LCD) for a handheld device.

With further reference to FIG. 3, the one or more I/O devices 310 are adapted to facilitate connection of the computing system 300 to another system and/or device and may therefore include one or more serial, parallel, small computer system interface (SCSI), universal serial bus (USB), IEEE 1394 (e.g., Firewire™), and/or personal area network (PAN) components. The network interface devices 312 comprise the various components used to transmit and/or receive data over a network. By way of example, the network interface devices 312 include a device that can communicate both inputs and outputs, for instance, a modulator/demodulator (e.g., modem), wireless (e.g., radio frequency (RF)) transceiver, a telephonic interface, a bridge, a router, network card, etc.

Various software and/or firmware has been described herein. It is to be understood that this software and/or firmware can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

The general nature of the DELI 100 having been described above, examples of operation of the DELI will now be discussed with reference to FIGS. 4 and 5. As identified above, the DELI 100 operates in two general operating modes, i.e., a transparent mode and a nontransparent mode, as well as combinations thereof. In describing operation in these modes, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Generally speaking, irrespective of whether the DELI 100 has gained control over the execution of the application 102 transparently or nontransparently, the application does not execute directly on the hardware 104. Rather, application code executes through the DELI 100 in the form of code fragment that may be maintained in the code cache(s) 124.

Figure 4:
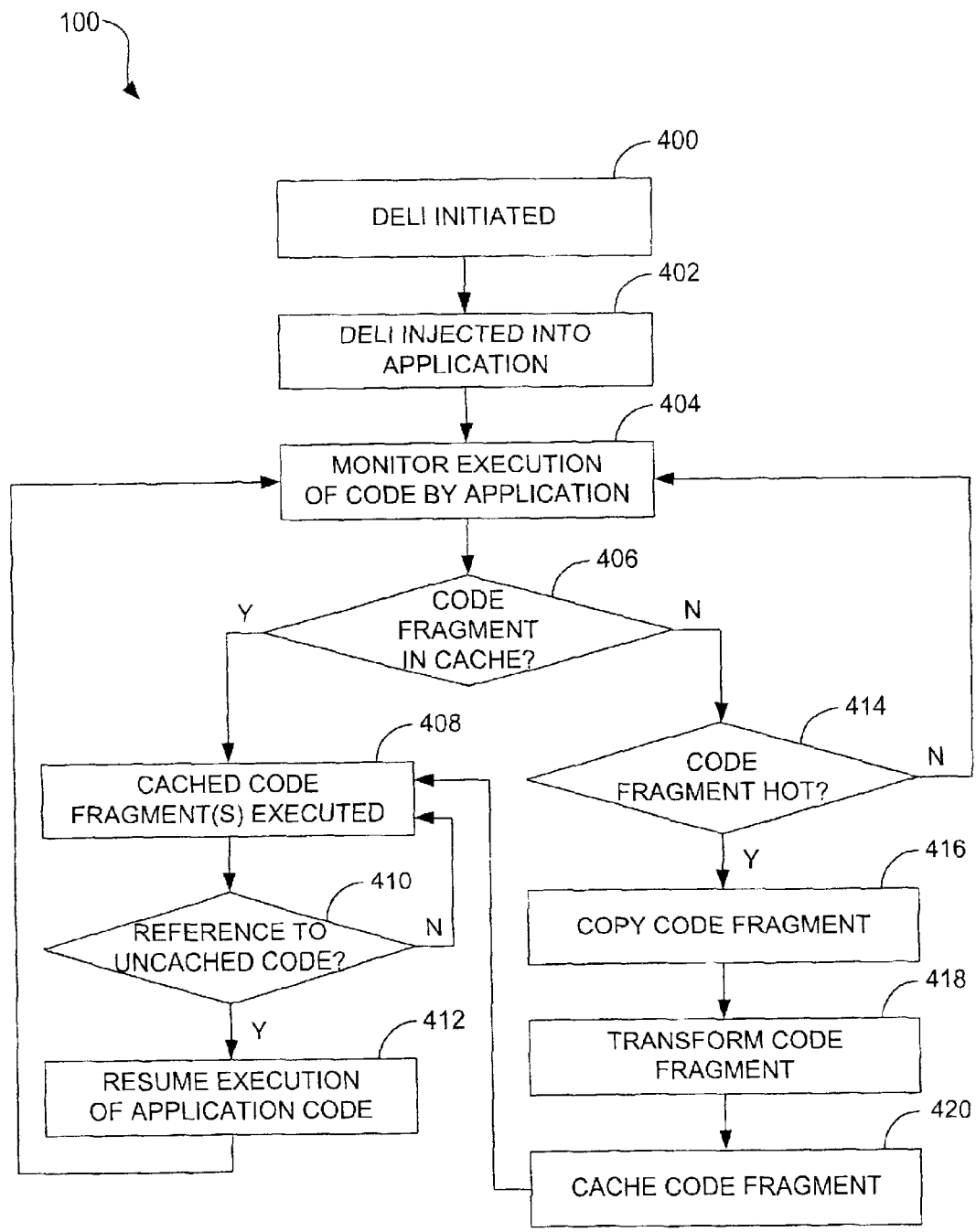
FIG. 4 is a flow diagram that illustrates an example of the DELI shown in FIG. 1 operating in a transparent mode.
Figure 5:
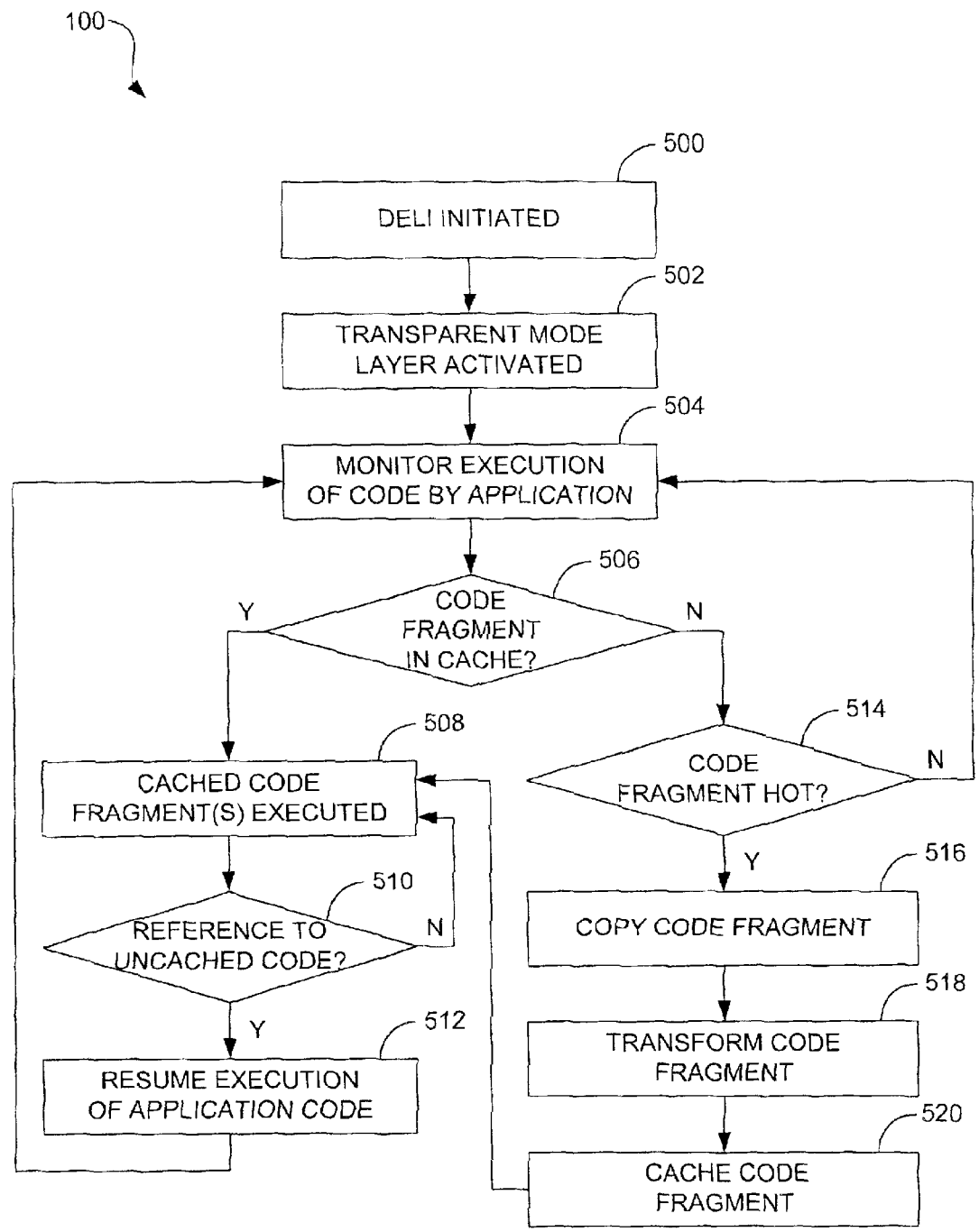
FIG. 5 is a flow diagram that illustrates an example of the DELI shown in FIG. 1 operating in a nontransparent mode.

FIG. 4 illustrates a simple example of DELI operation in the transparent mode. More particularly, FIG. 4 illustrates DELI operation in a completely transparent mode in which the application 102 is unaware of the DELI's presence. Beginning with block 400, the DELI 100 is first initiated. When operating in the transparent mode, this initiation can result from initiation of the application 102. Upon its initiation, the DELI 100 is injected into the application 102 with the injector 126 of the transparent mode layer 110, as indicated in block 402, such that the DELI gains control over the application and its execution. As noted above, there are various different methods in which this control can be gained.

Once the DELI 100 has control over the application 102, the DELI can be used to provide any one of several different services such as those noted above. For instance, the DELI 100 can facilitate hardware and/or software emulation, dynamic translation and optimization, transparent remote code execution, remapping of computer system functionality for virtualized hardware environments program, code decompression, code decryption, etc. These different services each involve the caching and the linking of program code fragments within the code cache(s) 124. By caching certain fragments of code copied from the application binaries and transforming them in some manner, the desired services can be provided by later executing the transformed code from the code cache(s) 124.

Before caching code, the DELI 100 must determine which particular fragments of code to cache. In that, when operating in the completely transparent mode, the application 102 is unaware of the DELI 100, the DELI does not receive guidance from the application as to which code fragments to cache. Although the caching of code can be dictated through the policies created at the DELI build time, more preferably, the DELI 100 has the capability to, at least in part, make these determinations on its own. The DELI 100 can do this by monitoring the execution of code by the application 102, as indicated in block 404. In so doing, the DELI 100 can collect information as to, for instance, which code fragments are most useful to the application 102 by, for example, determining which fragments are most frequently used.

As the various code fragments are executed by the application 102 under the control of the DELI 100, the DELI "sees" each piece of code that is executed. Through the monitoring process, the DELI 100 can, therefore, determine which code fragments are used most frequently. The DELI 100 can then make the determination of which pieces of code are "hot," i.e., most important to application execution with reference to the policies that are provided by the system control and configuration layer 112. As noted above, this determination can be made using program counters that track execution instances. Persons having ordinary skill in the art will appreciate that various other methods can be used to make the determination of which pieces of code are hot. Examples of the manner in which this determination can be made are described in U.S. patent application Ser. No. 09/186,945, filed Nov. 5, 1998, entitled "Method for Selecting Active Code Traces for Translation in a Caching Dynamic Translator," and U.S. patent application Ser. No. 09/312,296, filed May 14, 1999, entitled "Low Overhead Speculative Selection of Hot Traces in a Caching Dynamic Translator," both of which are hereby incorporated by reference into the present disclosure.

With further reference to FIG. 4, as each code fragment is executed, the DELI 100 can determine whether an associated code fragment has previously been cached, as indicated in decision element 406. If so, the DELI 100 jumps to the code cache(s) 124 that contains the cached (and typically transformed) code and this code is executed by the hardware 104 in lieu of the original application code, as indicated in block 408. The determination of whether the code has been cached can be made with reference to, as noted above, identifiers (e.g., tags) that identify the association between native application code and analogues that have been cached within the code cache(s) 124. Execution of the cached code then continues, including the execution of linked fragments of code that reside in the code cache(s) 124, until such time when a reference to code that has not been cached (i.e., a cache miss) is encountered. With reference to decision element 410, if a reference to uncached code is encountered, the DELI 100 jumps back to the application code and the execution of that code is resumed, as indicated in block 412. At this time, the DELI 100 can resume monitoring of this execution (block 404).

Returning to decision element 406, if the DELI 100 determines that an associated code fragment does not reside in the code cache(s) 124, flow continues to decision element 414 at which it is determined whether the code fragment is hot with reference to a predetermined policy. If the code is not hot, flow returns to block 404 at which monitoring of the application code execution continues. If, on the other hand, the code is hot, the code fragment is copied, as indicated in block 416, by fetching the fragment using the instruction fetch controller 128 of the transparent mode layer 110.

At this point, the code fragment can be transformed in some manner, as indicated in block 418. In addition, code fragments within the cache(s) 124 can be linked according to the policies that have been established for code linking. The nature of the code transformation depends upon the type of services that the DELI 100 is to provide. For example, where the DELI 100 is to merely optimize the application execution, this transformation can comprise rearranging and/or reconfiguring the code for better performance. Irrespective of the nature of the transformation provided, the code structure is modified in a way without modifying the underlying semantic. Once the code fragment has been transformed, the transformed code can be cached within the code cache(s) 124, as indicated in block 420, and executed within the DELI 100 with flow continuing to block 408 described above.

As noted above, the DELI 100 operates differently in the nontransparent mode. Generally speaking, when operating in the nontransparent mode, the DELI 100 may operate, for example, as a DLL or a statically linked module which exports functions in the API 108 that the application 102 can access. In the nontransparent mode, the application 102 (i.e., a client) is aware of the DELI 100 and is configured to utilize the DELI's services. In the simplest case, the client (e.g., emulator) controls every aspect of DELI operation through the API 108. In such a case, the DELI 100 can be utilized to cache, link, and optimize code according to explicit instructions provided by the client via the API 108. For instance, the DELI 100 can be instructed to cache certain code fragments believed to be most frequently used during application execution. This can be accomplished by, for instance, providing the location of the code to the DELI 100 by identifying a tag. In such a case, the DELI 100 does not monitor but instead records code fragments as commanded by the API 108. In addition, the client can instruct the DELI 100 as to which cached fragments to execute via the API 108 by identifying the applicable tags to the DELI.

In a more typical scenario, however, the client calls upon the DELI 100 to provide its services in a transparent manner. In such a case, the client invokes operation of the DELI 100, as well as provides instructions as to when the DELI is to halt its operation. FIG. 5 provides an example of operation in this manner.

Beginning with block 500, DELI 100 is initiated. In the nontransparent mode, this initiation occurs when a start command such as "DELI_START" is delivered by the API 108 that invokes the DELI 100. Once initiated, the transparent mode layer 110 can be activated, as indicated in block 502, and flow can continue in similar manner to the transparent mode described above in relation to FIG. 4. Accordingly, the DELI 100 can monitor the execution of code by the application (client) (504), determine whether a code fragment has been previously cached (506), execute cached code where applicable (508), copy hot code fragments (516), transform the copied code fragments (518), and cache transformed code fragments (520). Operation of the DELI 100 continues in this manner until the DELI encounters a condition which, as required by the client, causes the DELI to halt operation. By way of example, this interruption can be effected with a "DELI_STOP" command placed at the end of a function call sent to the DELI 100 via the API 108.

As noted above, the DELI 100 can be used to facilitate decoding of program binaries. For example, the DELI 100 can be used to decompress and execute compressed program code. As described above, there are several problems with current decompression/execution solutions including, for example, decreased system performance and the need for relatively large amounts of memory. These problems can be avoided, however, when the DELI 100 is used in that the DELI controls very small portions of code such as code fragments and even individual instructions. In operation, the DELI 100 can be used to decompress code fragments as well as cache the most frequently used code fragments in decompressed form within the code cache(s) 124. With such operation, smaller portions of the application code are decompressed, thereby reducing decompression overhead and requiring less of the available system memory. Moreover, in that the most frequently used code fragments are cached in decompressed form, much less dynamic decompression is needed, thereby improving performance.

Figure 6:
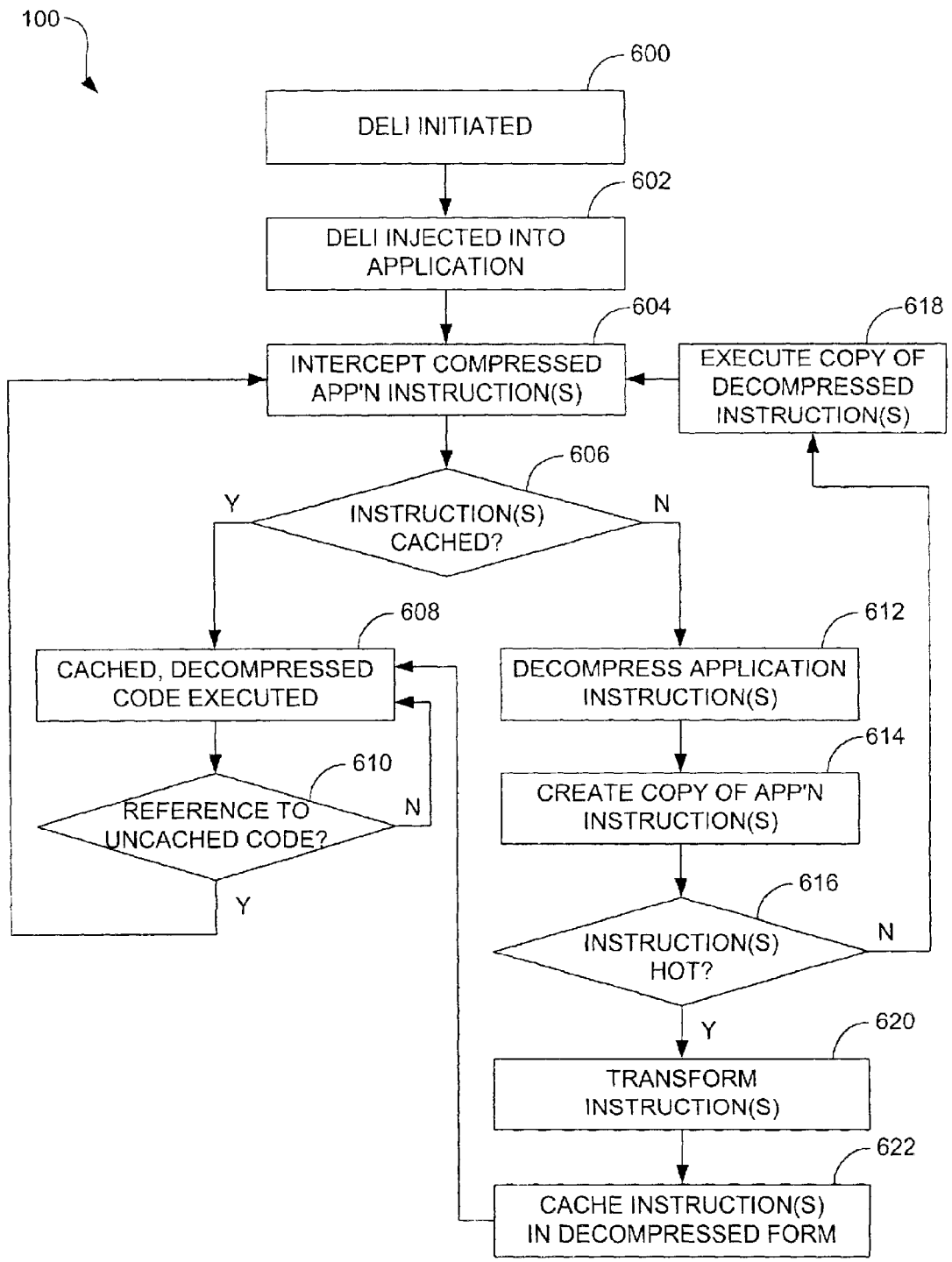
FIG. 6 is a flow diagram that illustrates an example of the DELI shown in FIG. 1 operating to provide decoding and execution services.

One example of operation of the DELI 100 in providing decoding and executing of application binaries is shown in FIG. 6. In this example, the decoding services are provided in the transparent mode of operation. Although the decoding is described in terms of decompression, persons having ordinary skill in the art will appreciate that other forms of decoding can be provided such as program code decryption. Beginning with block 600, the DELI 100 is initiated and, as indicated in block 602, injected into the application 102 before it starts so as to gain control over its execution. With this control, the DELI 100 can intercept the various compressed application instructions that are ultimately to be executed, as indicated in block 604.

As in the mode of operation described in relation to FIG. 4, the DELI 100 monitors the execution of code so it can be determined which code fragments to cache. Accordingly, as described above, the DELI 100 can determine whether an associated code fragment has previously been decompressed and cached, as indicated in decision element 606. If so, the DELI 100 jumps to the code cache(s) 124 that contains the decompressed code and this code is executed by the hardware 104 in lieu of the original application code, as indicated in block 608. Again, execution of the cached code continues until a reference to code that has not been cached is encountered (610) at which time the DELI 100 jumps back to the application code and block 604.

With reference back to decision element 606, if no associated code fragment resides in the code cache(s) 124, flow continues to block 612 at which the instructions are decompressed (i.e., decoded) by the DELI 100 so that the instructions can be evaluated. By way of example, this decompression can be provided by the decoding manager 130. Although this decompression (i.e., decoding) is described as being performed by the decoding manager 130 of the DELI 100, persons having ordinary skill in the art will recognize that this function could, alternatively, be performed by another component such as a software component of a client application or a hardware component of the underlying computing system. Once the instructions are decompressed, the DELI 100 creates a copy of the instructions, as indicated in block 614, for example to one or more instruction buffers. Next, with reference to decision element 616, the DELI 100 determines whether the application instructions are hot with reference to a predetermined policy. If the instructions are not hot, flow continues to block 618 at which the copied, decompressed instructions are executed. If, however, the instructions are hot, the decompressed instructions are transformed as desired (620) and cached (622) in decompressed form so as to be available for execution the next time that particular functionality is required.

Such decompression and execution services can also be provided by the DELI 100 while operating in the nontransparent mode. For example, the application 102 (i.e., client) or another component (not shown) can be configured to decompress the application code and invoke the DELI 100 to cache the decompressed code that is most frequently used. In such a scenario, flow is similar to that shown in FIG. 5 except that the code executed by the application 102 is previously compressed code.

Whether the decoding services are provided by the DELI 100 in the transparent or nontransparent mode, several advantages over prior solutions may be achieved both in terms of system performance and memory utilization. For example, where decompression/execution services are provided, an approximately 10% decompression penalty may be observed as compared with as much as a 50% penalty encountered with software solutions in which large portions of code must be decompressed. In terms of memory, in that most of the application code remains in compressed form, much less memory is needed during execution as compared to current software solutions.

While particular embodiments of the invention have been disclosed in detail in the foregoing description and drawings for purposes of example, it will be understood by those skilled in the art that variations and modifications thereof can be made without departing from the scope of the invention as set forth in the following claims. For instance, although the DELI has been described above as only providing decoding and executing services, it is to be noted that various other services can simultaneously be provided by the DELI. For instance, the decoding and executing services provided by the DELI can be utilized when performing other tasks including, for instance, hardware or software emulation that is facilitated by the client. The present disclosure is intended to include such applications.

What is claimed is:

1. A method for decoding program instructions, comprising:

intercepting program instructions;

determining if associated instructions have been decoded and cached; and decoding and copying the program instructions if associated instructions have not been cached;

wherein decoding the program instructions comprises at least one of decrypting the instructions and decompressing the instructions.

2. The method of claim 1, further comprising gaining control over execution of program instructions by injecting a dynamic execution layer interface into the program.

3. The method of claim 1, further comprising executing cached, decoded instructions if associated instructions have been decoded and cached.

4. The method of claim 1, further comprising determining whether the decoded and copied instructions are frequently used instructions.

5. The method of claim 4, further comprising caching the decoded and copied instructions if the instructions are frequently used instructions.

6. The method of claim 5, further comprising transforming the instructions prior to caching them.

7. The method of claim 4, further comprising executing the decoded and copied instructions if the instructions are not frequently used instructions.

8. A system for decoding program instructions, comprising:

means for intercepting program instructions;

means for determining if associated instructions have been decoded and cached;

means for decoding the program instructions by decrypting the instructions or decompressing the instructions; and means for copying the decode program instructions that have not been cached.

9. The system of claim 8, further comprising means for gaining control over execution of program instructions.

10. The system of claim 8, further comprising means for executing cached, decoded instructions.

11. The system of claim 1, further comprising means for determining whether the decoded and copied instructions are frequently used instructions.

12. The system of claim 11, further comprising means for caching the decoded and copied instructions.

13. The system of claim 12, further comprising means for transforming the instructions.

14. A decoding program stored on a computer-readable medium, comprising:

logic configured to intercept program instructions;

logic configured to determine if associated instructions have been decoded and cached; and logic configured to decode the program instructions by decrypting the instructions or decompressing the instructions; and logic configured to copy the decoded program instructions that have not been cached.

15. The program of claim 14, further comprising logic configured to gain control over execution of program instructions.

16. The program of claim 14, further comprising the logic configured to execute cached, decoded instructions.

17. The program of claim 14, further comprising logic configured to determining whether the decoded and copied instructions are frequently used instructions.

18. The program of claim 17, further comprising logic configured to cache the decoded and copied instructions.

19. The program of claim 18, further comprising logic configured to transforming the instructions.

20. A method for decompressing and executing compressed program code, comprising:
   intercepting compressed program instructions;
   determining if associated instructions have been decompressed and cached; and
   decompressing and copying the compressed program instructions if associated instructions have not been cached.

21. The method of claim 20, further comprising executing cached, decompressed instructions if associated instructions have been decompressed and cached.

22. The method of claim 20, further comprising determining whether the decompressed and copied instructions are frequently used instructions.

23. The method of claim 22, further comprising caching the decompressed and copied instructions if the instructions are frequently used instructions.

24. The method of claim 23, further comprising transforming the decompressed instructions prior to caching them.

25. The method of claim 22, further comprising executing the decompressed and copied instructions if the instructions are not frequently used instructions.

26. A dynamic execution layer interface (DELI) residing between at least one application and computing system hardware, comprising:
   a core configured to cache and execute certain application code fragments;
   an application programming interface configured to provide access to caching and executing functions of the core;
   a system control and configuration layer configured to provide policies for operation of the core; and
   a decoding manager that is configured to decode application code fragments by at least one of decrypting the instructions and decompressing the instructions.

27. The DELI of claim 26, further comprising a transparent mode layer configured to enable the core to gain control transparently over application code execution.

28. The DELI of claim 27, wherein the transparent mode layer is further configured to fetch code fragments from the at least one application.

29. The DELI of claim 28, wherein the system control and configuration layer is further configured to control whether the transparent mode layer is enabled.

* * * * *

UNITED STATES PATENT AND TRADEMARK OFFICE
CERTIFICATE OF CORRECTION

PATENT NO. : 6,920,550 B2
APPLICATION NO. : 09/999451
DATED : July 19, 2005
INVENTOR(S) : Giuseppe Desoli It is certified that error appears in the above-identified patent and that said Letters Patent is hereby corrected as shown below:

On the face page, in field (75), in "Inventor", in column 1, line 1, delete "Giusepp Des li" and insert -- Giuseppe Desoli --, therefor.

In column 14, line 46, in Claim 8, delete "decode" and insert -- decoded --, therefor.

Signed and Sealed this

Eleventh Day of August, 2009

David J. Kappos
*Director of the United States Patent and Trademark Office*